United States Patent [19]
Thro et al.

[11] Patent Number: 6,037,991
[45] Date of Patent: Mar. 14, 2000

[54] METHOD AND APPARATUS FOR COMMUNICATING VIDEO INFORMATION IN A COMMUNICATION SYSTEM

[75] Inventors: Stuart W. Thro, Cary; Gary W. Grube, Barrington; Paul J. Cizek, Palatine, all of Ill.

[73] Assignee: Motorola, Inc., Schaumburg, Ill.

[21] Appl. No.: 08/756,852

[22] Filed: Nov. 26, 1996

[51] Int. Cl.⁷ .................. H04N 7/173; H04N 7/14
[52] U.S. Cl. .................... 348/469; 348/12; 348/443; 348/384; 348/397; 455/5.1; 455/404
[58] Field of Search .................. 348/7, 12, 13, 348/14, 15, 16, 17, 441, 443, 469, 384, 390, 397, 398, 399, 402, 407, 409, 413, 433, 415, 416, 410, 411, 699; 455/5.1, 4.2, 404, 15; 370/465, 468, 412, 538

[56] References Cited

U.S. PATENT DOCUMENTS

| | | | |
|---|---|---|---|
| 4,888,795 | 12/1989 | Ando | 348/18 |
| 5,371,532 | 12/1994 | Gelman | 348/7 |
| 5,481,312 | 1/1996 | Cash | 348/466 |
| 5,510,844 | 4/1996 | Cash | 348/465 |
| 5,546,395 | 8/1996 | Sharma | 370/468 |
| 5,608,725 | 3/1997 | Grube | 370/338 |
| 5,712,903 | 1/1998 | Bartholomew | 379/89 |
| 5,796,724 | 8/1998 | Rajamani | 370/263 |

*Primary Examiner*—John K. Peng
*Assistant Examiner*—Wesner Sajous
*Attorney, Agent, or Firm*—Susan L. Lukasik

[57] ABSTRACT

A communication system (100) employs a method and apparatus for communicating video information therein. A first communication device (e.g., 101) preferably includes a video compressor (203), a memory device (205) containing a computer program, and a modem (207). The first device receives video information from a video device (116) via the video compressor and executes the computer program to determine a priority between transmission frame rate and resolution per frame. When transmission frame rate is of higher priority, the first device transmits the video information at a first transmission frame rate via the modem to a second communication device (e.g., 102). When resolution per frame is of higher priority, the first device transmits the video information at a second transmission frame rate that is less than the first rate. The second device, upon receiving the video information, may display (113) the information or process the information for retransmission (e.g., when the second device is a video control server (104)).

30 Claims, 4 Drawing Sheets

METHOD AND APPARATUS FOR COMMUNICATING VIDEO INFORMATION IN A COMMUNICATION SYSTEM

FIELD OF THE INVENTION

The present invention relates generally to communication systems and, in particular, to communicating video information in a communication system.

BACKGROUND OF THE INVENTION

Public safety radio communication systems typically employ two-way voice communications for the conveyance of information between users of such systems. Each voice communication typically requires the user of the transmitting radio communication device (e.g., mobile or portable radio) to perform two functions simultaneously. First, the user of the radio must hold a microphone and depress a push-to-talk button. Second, the user of the radio must organize his or her thoughts without distraction, so that the user can vocalize the vital information that needs to be conveyed to the other users. Performance of these two functions simultaneously can be especially difficult for public safety users (such as police officers) during emergency situations, because such users are often simultaneously performing other distracting tasks, such as negotiating traffic and operating their lights and sirens, while, at the same time, attempting to perform the two requisite functions. Consequently, the unavoidable distractions associated with traveling to an emergency scene can result in vital information not being conveyed between system users.

The impact of unavoidable distractions on public safety system users is also extended to the dispatch operator in such a system. For example, communications regarding traffic congestion, alternate routes, or the circumstances at an emergency scene when the first mobile radio user arrives may be of great importance to the dispatcher. Upon receiving such communications, the dispatcher can take corrective action, including assigning an appropriate number of mobile users to the scene or redirecting mobile users to the correct location in the event that an original location was in error. However, when distractions prevent a mobile user from communicating the necessary information to the dispatch operator, the dispatch operator cannot make an informed decision as to what corrective action, if any, to take in the circumstances.

Video conferencing techniques are known, but they are not currently adapted for use in radio communication systems and do not provide the flexibility necessary for use by public safety personnel during emergency situations.

Therefore, a need exists for a method and apparatus for providing video information in a communication system that permit vital information to be accurately and expediently distributed to users of the communication system. Such a method and apparatus that permit video information to be conveyed within a radio communication system would be an improvement over the prior art.

DESCRIPTION OF A PREFERRED EMBODIMENT

Generally, the present invention encompasses a method and apparatus for communicating video information in a communication system. A first communication device preferably includes a video compressor, a memory device having a computer program stored therein, and a modem. The first communication device receives video information from a video device via the video compressor and executes the computer program to determine a priority between transmission frame rate and resolution per frame. When transmission frame rate is of a higher priority than resolution per frame, the first communication device transmits the video information at a first transmission frame rate to a second communication device via the modem and a communication resource. However, when resolution per frame is of a higher priority than transmission frame rate, the first communication device transmits the video information at a second transmission frame rate via the modem and the communication resource, wherein the second transmission frame rate is less than the first transmission frame rate. The second communication device, upon receiving the video information, either displays the video information to a user or processes the received video information for retransmission (e.g., when the second communication device is a video control server or a dispatch operator position). By communicating video information in this manner, the present invention permits a desired type of video information to be selectively conveyed at the appropriate time and in the appropriate circumstances.

Figure 1:
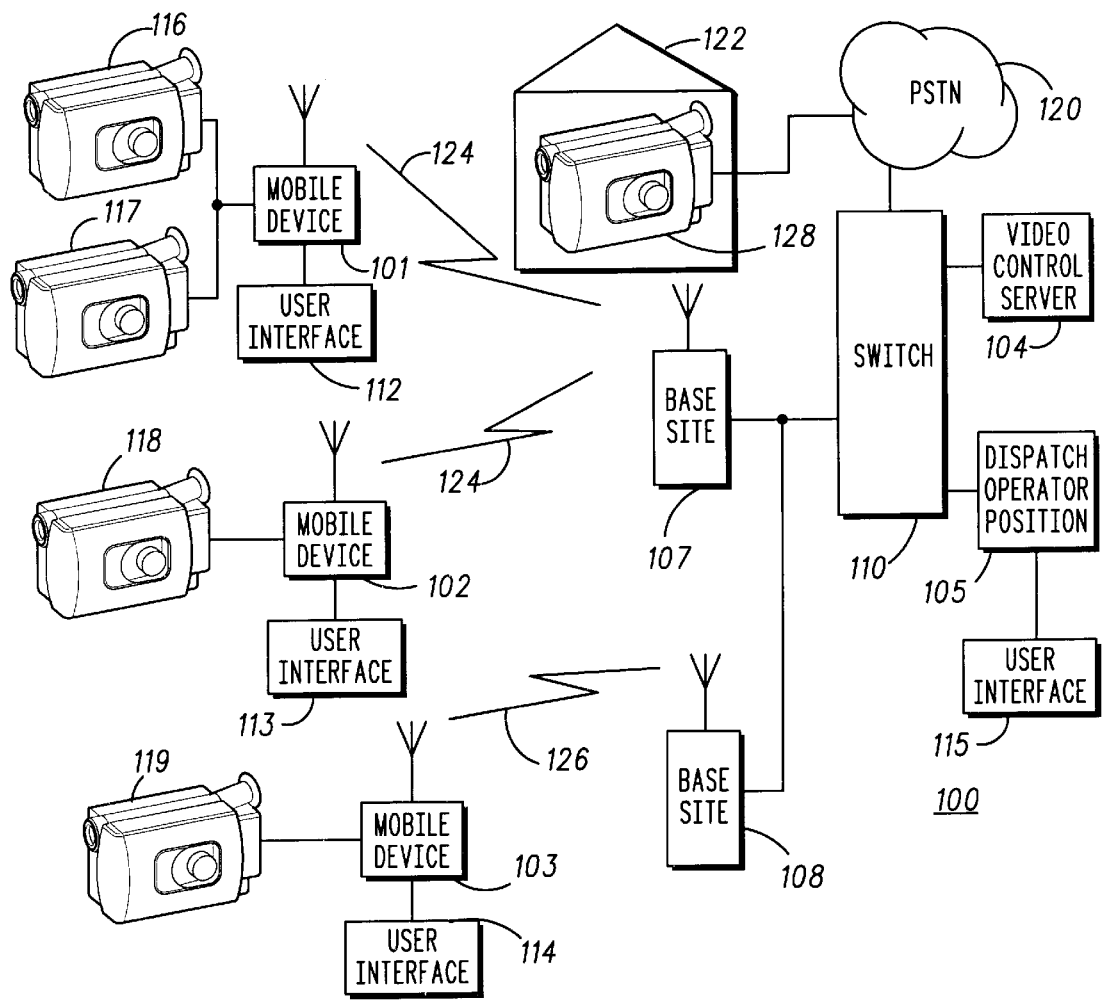
FIG. 1 illustrates a block diagram depiction of a radio frequency video communication system in accordance with a preferred embodiment of the present invention.

The present invention can be more fully understood with reference to FIGS. 1–7. FIG. 1 illustrates a block diagram depiction of a radio frequency (RF) video communication system 100 in accordance with a preferred embodiment of the present invention. The communication system 100 includes a plurality of communication devices 101–105, a plurality of base sites 107–108, and a switch 110 that provides access between the RF communication system 100 and the public switched telephone network (PSTN, 120). The base sites 107–108 and the switch 110 form a substantial portion of the communication system's infrastructure. The communication devices 101–105 comprise any type of two-way communication device. As shown in FIG. 1, communication devices 101–103 comprise mobile two-way radio devices, communication device 104 comprises a video control server located within the communication system infrastructure, and communication device 105 comprises a dispatch operator position of a dispatch console.

Each mobile communication device 101–103 and dispatch operator position 105 is preferably coupled to a user interface 112–115. In addition, each mobile communication device 101–103 is preferably coupled to at least one video device 116–119. The user interfaces 112–114 preferably include a display, such as a cathode ray tube (CRT) or an active liquid crystal display (LCD), to allow the user of the respective communication device 101–103, 105 to view the video provided by the local video device or the video received from a remote video device, as later described. The user interfaces 112–115 may also include a keyboard to permit the device user (e.g., a police officer) to enter various other information for subsequent transmission. The video devices 116–119 preferably comprise well-known video cameras. The internal details of the mobile communication devices 101–103 are described below with regard to FIG. 2.

Video information is communicated in the RF video communication system 100 substantially as follows in accordance with the present invention. For the purposes of this discussion, the present invention will be described in the context of a wireless public safety system, although other wireless or wireline communication systems may utilize the techniques described herein. When a police dispatcher at the dispatch operator position 105 receives an emergency 9-1-1 call from a PSTN subscriber at an emergency location 122, the dispatch operator transmits a call to one or more police vehicles in accordance with known techniques. In a preferred embodiment, each police vehicle includes a mobile communication device 101–103, a user interface 112–114, and one or more video devices 116–119. Upon contacting the appropriate vehicles, the dispatcher or the system infrastructure determines which of the police cars is closest to the emergency location 122. This determination may be made using any one or more of a variety of known techniques, including, but not limited to, (1) the police officers stating their locations and the dispatch operator making the determination with reference to the operator's own knowledge of the locale or with reference to a local map; or (2) the police vehicles including location receivers, such as a global positioning satellite (GPS) receivers, that automatically determine the vehicles' locations with respect to a reference location and transmitters for conveying the vehicle locations to the dispatch operator position 105 or the video control server 104.

Once the lead vehicle is determined (e.g., the vehicle containing mobile communication device 101, user interface 112, and video devices 116–117), the dispatcher can instruct the officer driving the lead vehicle to begin transmitting video information. In this case, the officer will manually select which video device to begin transmitting with. In an alternative embodiment, the dispatch operator position 105 or the video control server 104 can automatically select the video device for transmission via control signaling. For example, when the lead vehicle is moving toward its destination (i.e., the emergency location 122), the video control server 104 might instruct the mobile communication device 101 to start receiving video information from the video device directed out of the vehicle's front window.

Once the video device 116 is selected, the mobile communication device 101 begins receiving video information from the selected video device 116. It should be noted that multiple video devices 116–117 may be selected for transmission. In this case, the mobile communication device 101 receives video information intermittently from each selected video device 116–117.

The mobile communication device 101 also determines a priority between transmission frame rate and resolution per video frame to establish the mobile communication device's mode of operation for the subsequent transmission of the video information. The transmission frame rate is the rate (usually in frames per second) at which the video information will be transmitted. The resolution per video frame (or resolution per frame) is the image quality per frame. Since each communication resource, such as RF communication resources 124, 126, is typically limited in bandwidth, each communication resource can carry only a certain, fixed amount of information every second. This information can be in the form of many frames with fewer bits in each frame or fewer frames with many bits in each frame. In order to transmit more image updates per second, the transmission frame rate is given priority and is increased (i.e., the information is transmitted with many frames having fewer bits per frame). The disadvantage with using high transmission frame rates is that the image quality is degraded. In order to transmit high quality images, the transmission frame rate must be decreased (i.e., the information must be transmitted with fewer frames having many bits per frame). Such is the case when resolution per frame is of higher priority. The disadvantage with better image quality is that motion cannot be detected easily.

The mobile communication device's priority determination (and accordingly mode of operation) may occur in any one of a variety of ways. In a first embodiment, the mobile communication device 101 automatically determines the priority based on the movement of the mobile communication device 101. When the mobile communication device 101 determines that it is moving (e.g., through use of a GPS receiver or through detection of frame-to-frame changes in the image received from the video device 116), the mobile communication device 101 determines that transmission frame rate is of a higher priority than resolution per frame to allow a viewer of the video information to perceive the movement. In a second embodiment, the user of the mobile communication device 101 manually selects the priority between transmission frame rate and resolution per frame based on the user's perceptions of the circumstantial conditions at the location of the mobile communication device 101.

In a third embodiment, a user of another communication device (e.g., mobile communication device 102 or the dispatch operator position 105) manually determines the priority between transmission frame rate and resolution per frame, for example, based on the user's viewing of the transmitted video. In this case, once the user of the second communication device makes his/her priority selection, the user, via his/her respective communication device, communicates the priority selection to the mobile communication device 101 in the lead vehicle (e.g., using a control or data communication resource or channel). In a fourth embodiment, another communication device (e.g., mobile communication device 102, the dispatch operator position 105, or video control server 104) automatically determines the priority between transmission frame rate and resolution per frame, for example, based on a location of the mobile communication device 101 with respect to the mobile communication device's intended destination. While the mobile communication device 101 is relatively far away from its intended destination (e.g., the emergency location 122), the video control server 104 might determine that transmission frame rate is of a higher priority than resolution per frame. On the other hand, when the mobile communication device 101 nears its intended destination, the video control server 104 might determine that resolution per frame is of a higher priority than transmission frame rate. Once the video control server 104 makes its priority selection, it communicates the selection to the mobile communication device 101 via the switch 110 and a base site 107.

Once the priority between transmission frame rate and resolution per frame is determined, the mobile communication device 101 enters one of two modes of operation and transmits the video information received from the video device 116 or video devices 116–117 based on the determined priority. In a first mode of operation, when transmission frame rate is of a higher priority than resolution per frame, the mobile communication device 101 transmits the video information at a first transmission frame rate (e.g., 20 frames per second) via an uplink (mobile-to-base site) of communication resource 124 to the base site 107 serving the mobile communication device 101. In a preferred embodiment, the communication resource 124 supports any one or more of the following communication formats: time division multiple access (TDMA), frequency division multiple access (FDMA), or code division multiple access (CDMA).

In a second mode of operation, when resolution per frame is of a higher priority than transmission frame rate (e.g., when the lead vehicle has reached its intended destination), the mobile communication device 101 transmits the video information at a second transmission frame rate (e.g., 5 frames per second) that is less than the first transmission frame rate via the uplink of communication resource 124.

In an alternative embodiment, the above-described priority selection techniques can be used to establish different priorities for video transmissions from each of multiple video devices 116–117. Thus, when both video devices 116–117 are selected to provide video information to mobile communication device 101 (e.g., due to manual or automatic selection of the video devices 116–117 in response to circumstantial conditions of the mobile communication device 101, such as whether the mobile communication device 101 is in motion or whether the mobile communication device 101 is at rest at its intended destination), any one or more of the priority selection techniques can be used to select independent priorities for each video device 116–117. For example, when the mobile communication device 101 arrives at the emergency location 122, the video control server 104 might automatically instruct video device 116 to provide a still wide angle view of the location 122, while instructing video device 117 to pan across the location 122. In this case, resolution per frame would be of a higher priority for the video information provided by video device 116; whereas, transmission frame rate would be of a higher priority for the video information provided by video device 117.

Upon receiving the video information from each video device 116–117, the mobile communication device 101 preferably selects the two transmission frame rates (one for the video information provided by video device 116 and the other for the video information provided by video device 117) such that the video information from both video devices 116–117 may be simultaneously transmitted over a single communication resource. For instance, if the communication resource 124 can support 20 frames per second, the mobile communication device 101 might transmit 15 frames per second of video information provided by video device 117 and 5 frames per second of video information provided by video device 116. Therefore, the transmission frame rate of the video information provided from one video device will be directly dependent on the transmission frame rate of the video information provided from any other video devices when fixed bandwidth communication resources 124, 126 are used to convey the video information.

In addition to mobile communication device 101 providing video information for use by the other mobile communication devices 102–105, one or more of the other mobile communication devices 102–103 may also be selected to provide video information. Moreover, a security video device 128 at the emergency location 122 may further be selected to provide video information to the video control server 104 via the PSTN 120 and the switch. In this case, each selected mobile communication device 101–103 transmits its video information at a respective transmission frame rate via an uplink of a respective communication resource 124, 126. Upon receipt at the base sites 107–108, the base sites 107–108 provide the received video information to the video control server 104 via the switch 110. In the preferred embodiment, the video control server 104 controls operation of switch 110 in accordance with known techniques to allow video information to pass between the video control server 104, the PSTN 120, and the base sites 107–108.

Upon receipt of the video information from the multiple video devices 116–119, 128, the video control server 104 processes the received video information for subsequent transmission to the mobile communication devices 101–103 and dispatch operator position 105. For example, in one embodiment, the video control server 104 receives video information at a first transmission frame rate (e.g., 15 frames per second) from one video source (e.g., mobile communication device 102 via communication resource 124) and video information at a second transmission frame rate (e.g., 5 frames per second) from another video source (e.g., mobile communication device 103 via communication resource 126). Each transmission frame rate corresponds to a respective resolution per frame. As discussed above, the higher the transmission frame rate, the lower the resolution per frame.

Upon receipt of the two video information signals, the video control server 104 combines the two signals (e.g., by buffering the two signals for a one second period and then appending one signal to the other) to form a composite video information signal. Depending on the received transmission frame rates for the two (or more) video signals, the video control server 104 might then truncate or otherwise adjust one or all of the received video signals in order to facilitate transmission of the composite video signal at a transmission frame rate compatible with the system communication resources 124, 126. Once the video control server 104 completes formation of the composite video signal, the video control server 104 transmits the composite video signal at the selected transmission frame rate to the dispatch operator position 105 and the mobile communication devices 101–103 via the switch 110 and downlinks (base sites-to-mobiles) of the communication resources 124, 126.

In another embodiment, the video control server 104 might receive video information from one mobile communication device 103 at a first transmission frame rate (e.g., 15 frames per second) and then convert the first transmission frame rate to a lower transmission frame rate (e.g., 10 frames per second) for subsequent transmission. In this case, the video control server 104 performs the conversion when, for example, the video control server 104 either automatically on its own or in response to input from another device, such as the dispatch operator position 105, determines that transmissions must be at a lower transmission frame rate than originally received in order to use the same transmission path to send other information simultaneously with the video.

Once the appropriate video devices and transmission frame rate have been selected, the video information is transmitted from the transmitting communication device (e.g., 101) and received by the receiving communication devices 102–105. To receive the transmitted video information, each receiving communication device 102–105 first determines the priority between transmission frame rate and resolution per frame. This determination may be made in any one or more of the following ways. First, when the receiving communication device (e.g., 102) is also the communication device that, prior to receiving the video transmission, communicated the priority to the transmitting communication device 101, the receiving communication device 102 need only store the selected priority prior to communication of it to the transmitting communication device and then recall the stored priority to determine at what transmission frame rate the transmitted information will be coming.

Alternatively, the receiving communication device (e.g., 105) might determine circumstantial conditions at a location of the transmitting communication device 101 and select the priority or priorities based on the circumstantial conditions. For example, the dispatch operator position 105 might determine, from GPS signaling and control signaling from the video control server 104, that the transmitting communication device 101 is stationary and at the intended destination, but that other dispatched mobile communication devices 102–103 have not yet reached the intended destination. In this case, the receiving device 105 might select transmission frame rate to have a higher priority than resolution per frame for transmissions from each mobile communication device 102–103 that is still in route to the intended destination, while selecting resolution per frame to have a higher priority than transmission frame rate for transmissions from each mobile communication device 101 that is already at the intended destination. Once the priority is selected, the receiving communication device 105 communicates the selected priority to the transmitting communication device 101 via the switch 110, base site 107, and communication resource 124.

In another embodiment, the receiving communication device (e.g., 103) might select the priority based on whether or not the transmitting communication device (e.g., 101) is in motion. For example, the user of the receiving communication device 103 could determine through audio communications with the dispatch operator and/or user of the transmitting communication device 101 that the transmitting communication device 101 is in motion. Upon making a determination that the transmitting communication device 101 is in motion, the receiving communication device 105 selects transmission frame rate to have a higher priority than resolution per frame and communicates the selected priority to the transmitting communication device 101 via communication resources 124, 126 and base sites 107–108.

Once the priority is determined, each receiving communication device 102–105 receives the transmitted video information at the transmission frame rate associated with the priority. Thus, when transmission frame rate is of a higher priority than resolution per frame, each receiving communication device 102–105 receives the transmitted video information at a first transmission frame rate (e.g., 15 frames per second). However, when resolution per frame is of a higher priority than transmission frame rate, each receiving communication device 102–105 receives the transmitted video information at a second transmission frame rate (e.g., 5 frames per second) that is less than the first transmission frame rate.

Although described above primarily with respect to communication devices in a radio communication system, the present invention is also applicable to a wireline only communication system or a mixed wireline/wireless communication system. In these cases, a wireline communication device, such as a video conference phone or a video-equipped personal computer, might perform the functions disclosed above with respect to the mobile communication devices 101–103, such as selecting transmission priority and providing video information via a telephone line to the PSTN 120 for distribution to other wireline or wireless devices.

Figure 2:
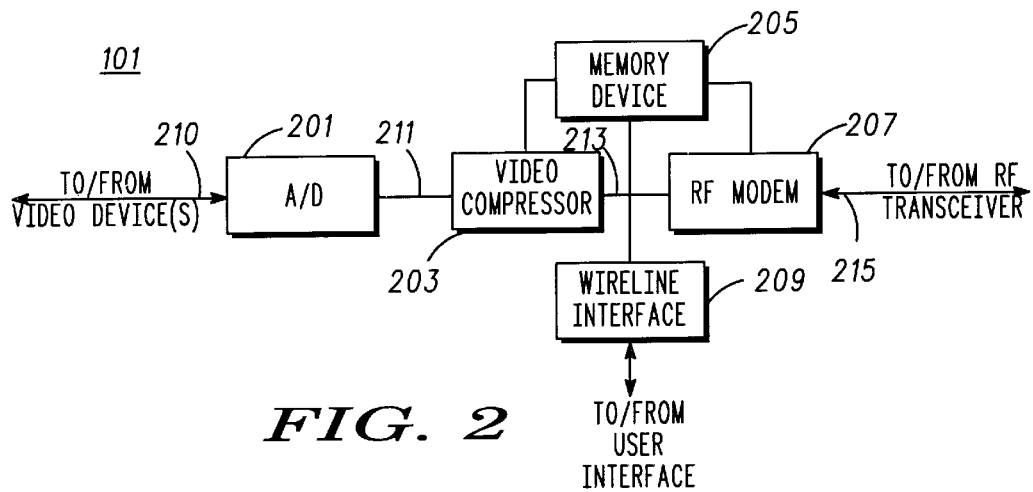
FIG. 2 illustrates a block diagram depiction of a mobile communication device in accordance with a preferred embodiment of the present invention.

FIG. 2 illustrates a block diagram depiction of a mobile communication device (e.g., 101) in accordance with a preferred embodiment of the present invention. The mobile communication device 101 includes an analog-to-digital converter (A/D) 201, a video compressor 203, a memory device 205, an RF modem 207, and a wireline interface 209. The A/D 201, which preferably comprises either an eight bit per pixel converter for monochrome images or a 24 bit per pixel converter for color images, communicates information between the video device or devices and the video compressor 203. The video compressor 203 preferably includes buffering memory to store the digitized video images together with means, such as digital signal processors (DSPs) executing software code or large scale integrated (LSI) circuits, for compressing digitized video information into a format suitable for transmission over a radio communication resource. In the preferred embodiment, the video compressor 203 compresses digitized video information into a known Moving Pictures Experts Group (MPEG) format, such as MPEG 4.

The memory device 205 preferably comprises random access memory for storing a computer program and a microprocessor to execute the stored computer program. The RF modem 207 preferably comprises means, such as an analog, digital, or software-based DSP modulation circuit, for modulating a compressed video signal into an RF transmission format, such as FDMA, TDMA, or CDMA. In the preferred embodiment, the RF modem 207 also includes means, such as an analog, digital, or software-based DSP demodulation circuit, for demodulating a received RF signal into a compressed video format, such as any one of the known MPEG formats. The wireline interface 209 is a well-known user interface, such as the known National Television Standards Committee (NTSC) format.

Upon receiving analog video information 210 from a video device (e.g., in the NTSC format), the A/D 201 converts the received analog information into digitized video information 211 and provides the digitized video information 211 to the video compressor 203. The video compressor 203 compresses the digitized video information 211 into a desired transmission format, such as MPEG 4, and provides the compressed video 213 to the RF modem 207 at a desired transmission frame rate. The transmission frame rate of the compressed video (and also of the subsequently transmitted video 215) is determined through execution of the computer program stored in the memory device 205. The computer program first determines a priority between transmission frame rate and resolution per frame. This priority determination may be made in any one of several ways, as described above, including manual selection of the priority by a user of the mobile communication device 101 via the user interface and the wireline interface 209. Once a priority is determined, the computer program selects one of at least two transmission frame rates based on the determined priority. When transmission frame rate is of a higher priority than resolution per frame, the computer program selects a first transmission frame rate (e.g., ten frames per second). However, when resolution per frame is of a higher priority than transmission frame rate, the computer program selects a second transmission frame rate (e.g., one frame per second) that is less than the first transmission frame rate. Once a transmission frame rate is selected, the memory device 205 conveys the selection to the video compressor 203 and the RF modem 207.

Upon receiving the compressed video 213 from the video compressor 203 at the selected transmission frame rate, the RF modem 207 modulates the compressed video 213 into a modulation and channel access format, such as TDMA, FDMA, or CDMA, that is compatible with the particular radio communication system. The RF modem 207 then provides the modulated video information 215 to an RF transceiver (not shown) for transmission over a radio communication resource.

As detailed above, the present invention provides a technique for providing dispatch video service in order to permit vital information flow between dispatch users. The present invention permits users of receiving communication devices to control the transmission frame rate and camera selection for a transmitting communication device so that users of the receiving devices can receive desired visual information. For example, with the present invention, a dispatch operator can control, through camera selection and transmission frame rate, the video information provided by a speeding police car to other en route police cars and the dispatch operator. By providing the video information in accordance with the present invention, the other police cars and the dispatch operator can obtain valuable information regarding en route traffic conditions and geographical conditions at the speeding car's destination that would be very difficult to obtain through conventional techniques (i.e., verbal communications from the police officer in the speeding car) when the police officer was also trying to navigate and drive expediently to the destination.

Figure 3:
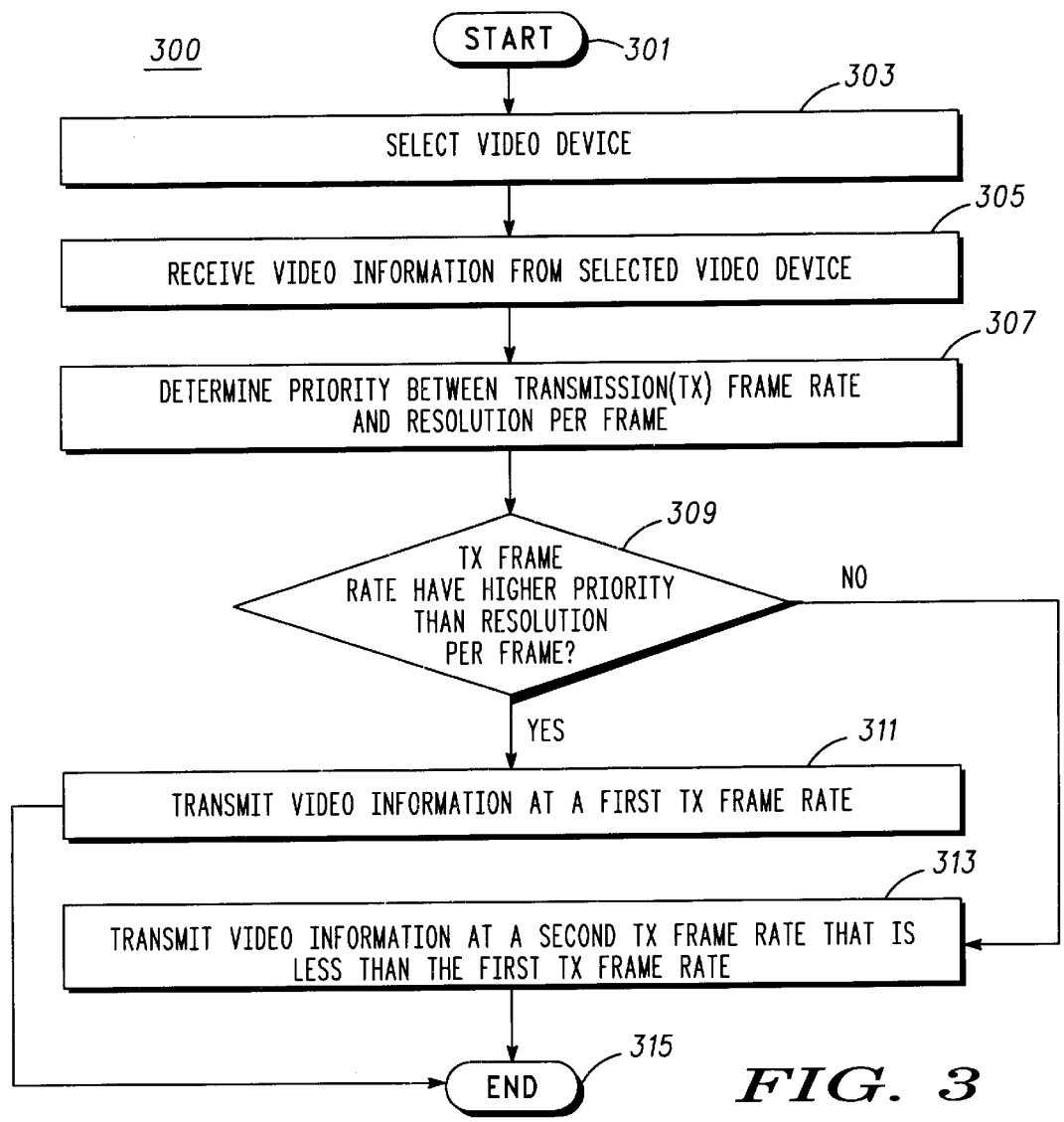
FIG. 3 illustrates a logic flow diagram of steps executed by a first communication device to provide video information to a second communication device in accordance with the present invention.

FIG. 3 illustrates a logic flow diagram 300 of steps executed by a first communication device to provide video information to a second communication device in accordance with the present invention. The logic flow begins (301) when the first communication device selects (303) a video device coupled to the first communication device. The video device may be either a single video camera or one of several video cameras coupled to the first communication device. When the video device comprises one of several video cameras, the selection of a particular video device may be made on the basis of the circumstantial conditions at a location of the first communication device. For example, the video camera directed out the front windshield of a police car containing the first communication device may be selected while the police car is in traffic; whereas, the video camera directed at the drivers side, back seat passenger may be selected when a criminal suspect has been apprehended and placed in that back seat. In addition, the selection of a particular video device may be made by the second communication device and communicated to the first communication device.

Once the video device is selected, the first communication device receives (305) video information (e.g., in an NTSC format) from the selected video device and determines (307) a priority between transmission frame rate and resolution per frame. The priority between transmission frame rate and resolution per frame may be made in any one of the variety of ways set forth above with regard to FIG. 1. That is, the priority determination may be made either automatically or manually by the first communication device, the second communication device, or the users of either one of the communication devices. Furthermore, in a preferred embodiment, the priority determination is made based on the circumstantial conditions at a location of the first communication device and on whether the first communication device is moving. For example, when the first communication device is moving, transmission frame rate has a higher priority than resolution per frame; whereas, when the first communication device is at rest, resolution per frame has a higher priority than transmission frame rate. However, when the first communication device is at rest at a crime scene and the selected camera is instructed to scan an area of the scene, transmission frame rate preferably has a higher priority than resolution per frame.

Upon determining the priority between transmission frame rate and resolution per frame, the first communication device determines (309) whether transmission frame rate has a higher priority than resolution per frame. When transmission frame rate has a higher priority than resolution per frame, the first communication device transmits (311), via a communication resource, the video information received from the selected video device to the second communication device at a first transmission frame rate, and the logic flow ends (315). When resolution per frame has a higher priority than transmission frame rate, the first communication device transmits (313), via the communication resource, the video information received from the selected video device to the second communication device at a second, lower transmission frame rate, and the logic flow ends (315). In a preferred embodiment, the first and second transmission frame rates are dynamically settable by the first communication device, the second communication device, or users thereof, provided that the second transmission frame rate (corresponding to the case when resolution per frame is of higher priority) is less than the first transmission frame rate.

Figure 4:
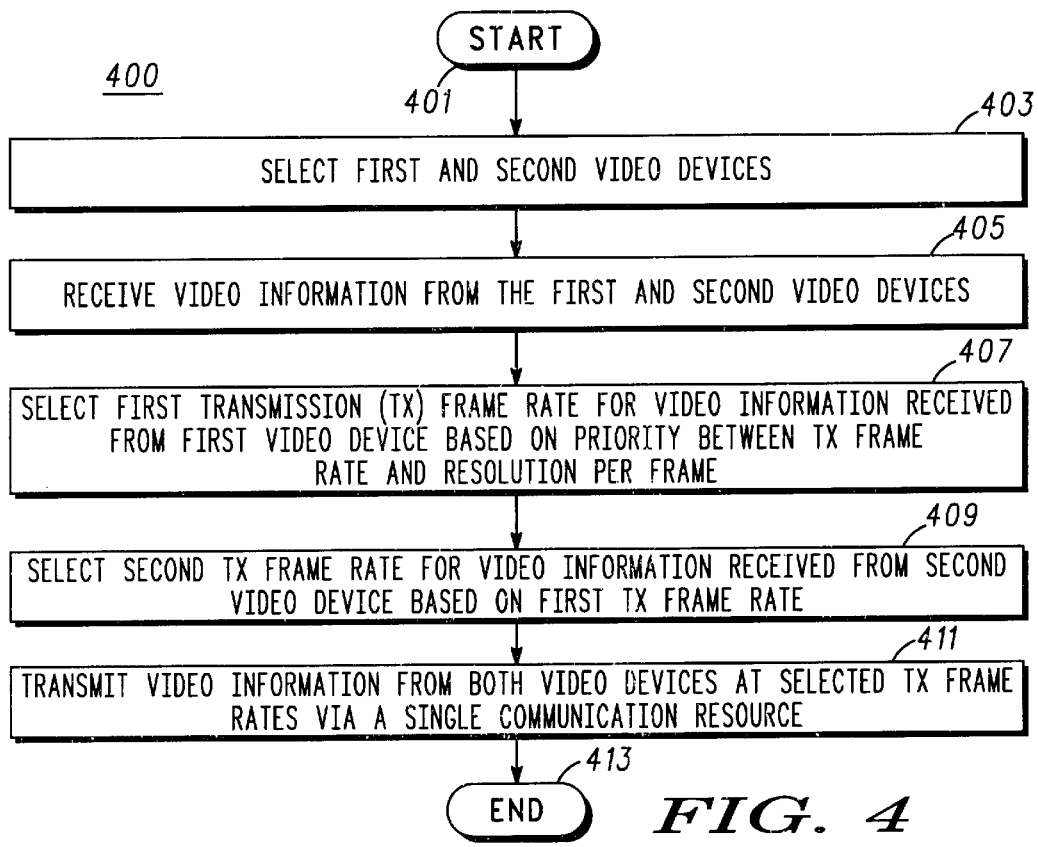
FIG. 4 illustrates a logic flow diagram of steps executed by a first communication device to provide video information to a second communication device in accordance with an alternative embodiment of the present invention.

FIG. 4 illustrates a logic flow diagram 400 of steps executed by a first communication device to provide video information to a second communication device in accordance with an alternative embodiment of the present invention. The logic flow begins (401) when the first communication device, either on its own accord or in response to a control signal from the second communication device, selects (403) a first video device and a second video device from a plurality of video devices that are coupled to the first communication device. The first communication device then receives (405) video information from the two selected video devices and selects (407) a first transmission frame rate for video information received from the first video device based on a priority between transmission frame rate and resolution per frame. In a preferred embodiment, the first communication device receives video information intermittently from each selected video device. For example, the first communication device might receive video information alternately from the first video device and then the second video device. As noted above, the priority determination may be made either automatically or manually by the first communication device, the second communication device, or users of either one of the communication devices.

In addition to selecting a transmission frame rate for video information received from the first video device, the first communication device also selects (409) a second transmission frame rate for video information received from the second video device based on the first transmission frame rate. The first communication device then transmits (411) the video information from both video devices at their respective selected transmission frame rates via a single communication resource (e.g., a radio communication resource), and the logic flow ends (413).

In this embodiment, the video information from all selected video devices is transmitted in the bandwidth of a single communication resource. Therefore, when multiple video devices are selected, the sum of the video information (in pixels per second) transmitted from all video devices cannot exceed the maximum capacity (in pixels per second) that can be supported by the bandwidth of the single communication resource. Accordingly, in this embodiment, the second transmission pixel rate (i.e., the transmission pixel rate for the video information to be transmitted from the second and all additional video devices) must be less than or equal to the difference between the maximum pixel capacity of the single communication resource and the first transmission pixel rate (i.e., the transmission pixel rate for the video information to be transmitted from the first video device), wherein transmission pixel rate is determined by multiplying transmission frame rate (frames per second) by resolution per frame (pixels per frame).

For example, if the single communication resource's maximum pixel capacity is 1.8 million pixels per second, then the first communication device can convey 15 frames per second over the communication resource at a resolution of 120,000 pixels per frame. If only one video device were selected and the desired resolution was 120,000 pixels per frame, the first communication device could transmit the video information from that one video device at 15 frames per second. However, if two or more video devices were selected, the first communication device must transmit the video information from those video devices at proportionately less frames per second to maintain the desired resolution per frame.

In addition, the first communication device may transmit varying transmission frame rates and resolutions per frame from each video device provided that the maximum pixel capacity of the single communication resource is not exceeded. For example, if the single communication resource's maximum pixel capacity is 1.8 million pixels per second, then the first communication device could transmit 10 frames per second at a resolution 120,000 pixels per frame (i.e., 1.2 million pixels per second) from a first video device and one frame per second at a resolution of 600,000 pixels per frame (i.e., 600,000 pixels per second) from a second video device. In this case, the video information provided by the first video device is transmitted at a moderate resolution (e.g., 400×300 pixels per frame); whereas, the video information provided by the second video device is transmitted at a high resolution (e.g., 895×670 pixels per frame).

Figure 5:
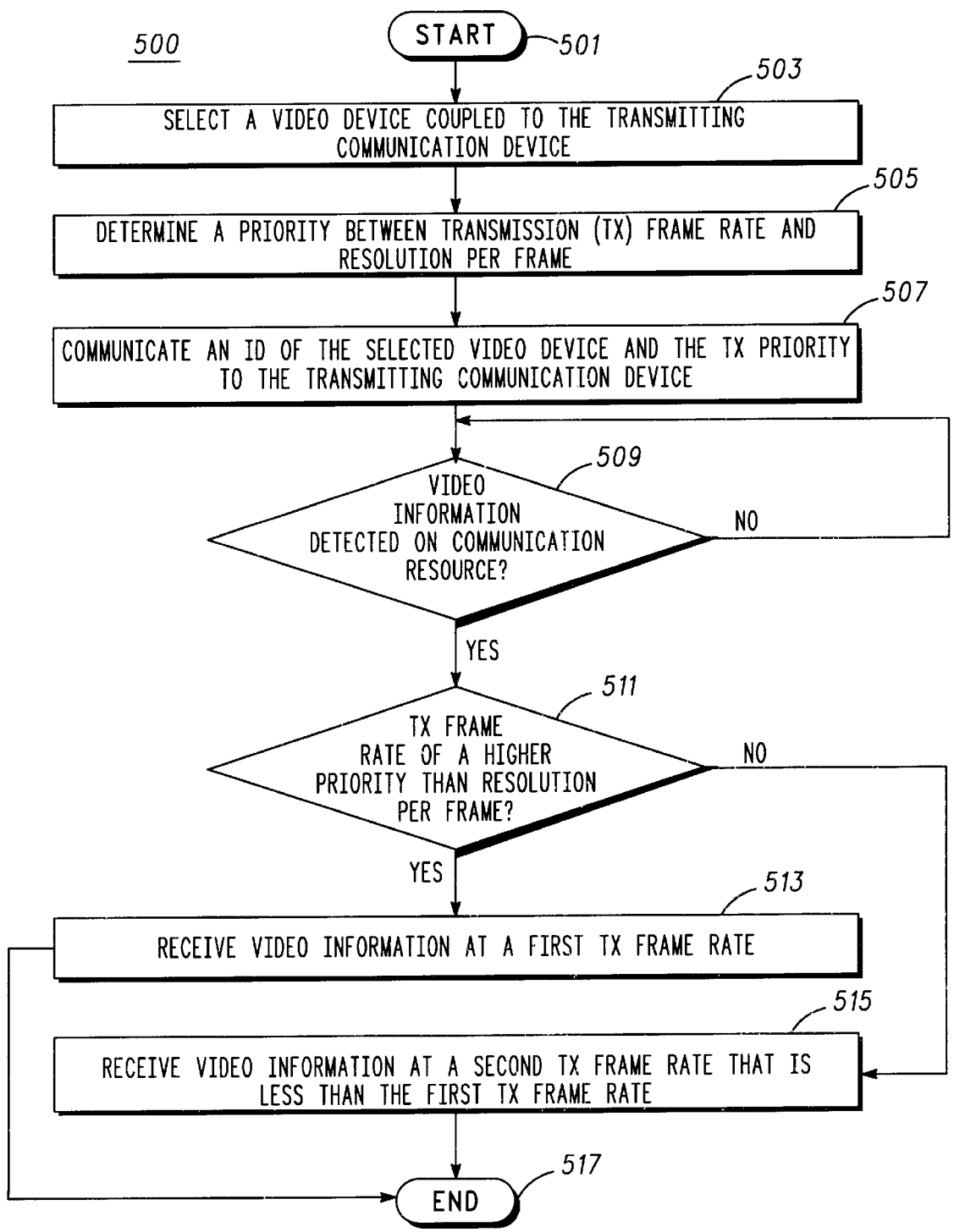
FIG. 5 illustrates a logic flow diagram of steps executed by a first communication device to obtain video information from a second communication device in accordance with the present invention.

FIG. 5 illustrates a logic flow diagram 500 of steps executed by a first communication device to obtain video information from a second communication device in accordance with the present invention. The logic flow begins (501) when the first, or receiving, communication device selects (503) a video device coupled to the second, or transmitting, communication device. This selection may be either automatic or manual and is preferably based on circumstantial conditions at a location of the transmitting communication device. The receiving communication device also determines (505) a priority between transmission frame rate and resolution per frame for video information transmitted by the transmitting communication device. Similar to selection of the video device, the priority determination may be either automatic or manual and is preferably based on circumstantial conditions at a location of the transmitting communication device. For example, when the transmitting device is in motion, the receiving communication device preferably determines that transmission frame rate has a higher priority than resolution per frame. In a preferred embodiment, the receiving communication device stores the priority determination in memory for future use.

Upon selecting the video device and determining the transmission priority, the receiving communication device communicates (507) an identification (ID) of the selected video device and the transmission priority to the transmitting communication device to request that the selected video device be the source of any transmitted video information and that any such transmitted video information have the appropriate priority. This communication may be performed audibly by voice transmission over a voice channel or electronically by transmission of control signals over a control channel.

Once the video device ID and transmission priority have been communicated to the transmitting communication device, the receiving communication device determines (509) whether it has detected video information on a communication resource (e.g., a radio communication resource) intended for the receiving communication device. When video information has been detected, the receiving communication device determines (511) whether transmission frame rate is of a higher priority than resolution per frame. This determination is preferably performed by simply retrieving the priority determination stored in memory before, or at the time of, communication of the priority to the transmitting communication device. When transmission frame rate has a higher priority than resolution per frame, the receiving communication device receives (513) the video information from the transmitting communication device at a first transmission frame rate via a communication resource, and the logic flow ends (517). When resolution per frame has a higher priority than transmission frame rate, the receiving communication device receives (515) the video information from the transmitting communication device at a second transmission frame rate via the communication resource, and the logic flow ends (315). The second transmission frame rate is less than first transmission frame rate since enhanced resolution requires additional bits per frame.

Figure 6:
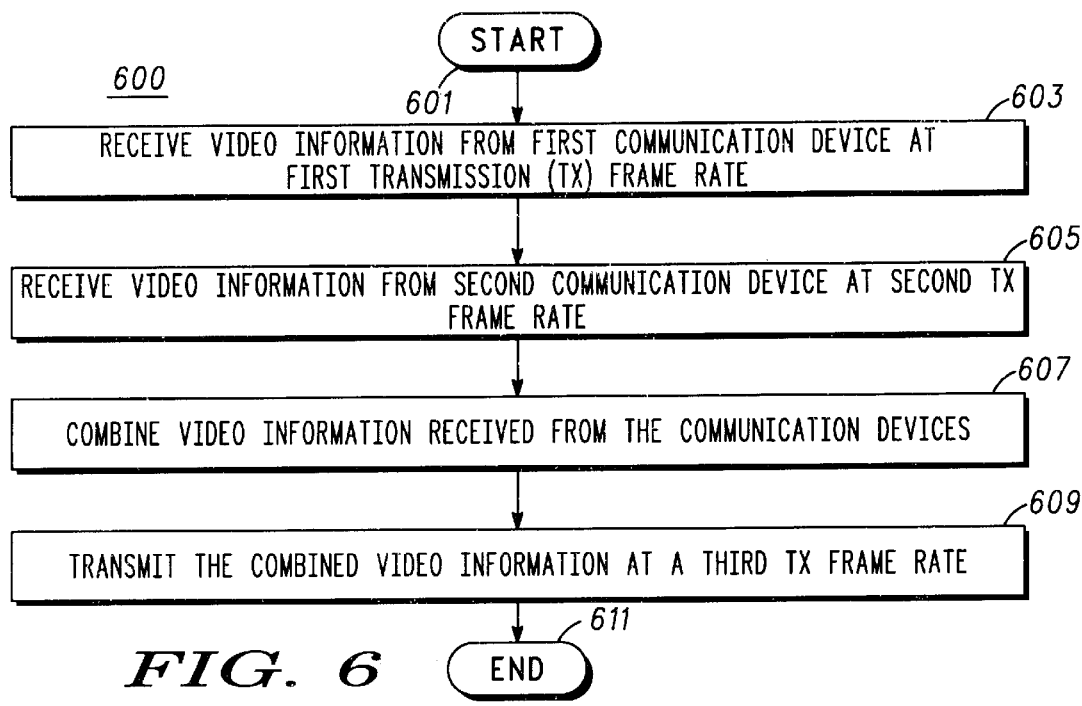
FIG. 6 illustrates a logic flow diagram of steps executed by a video control server to provide video information to at least one communication device in accordance with the present invention.

FIG. 6 illustrates a logic flow diagram 600 of steps executed by a video control server to provide video information to at least one target communication device in accordance with the present invention. The logic flow begins (601) when the video control server receives (603), via a communication resource, video information from a first transmitting communication device at a first transmission frame rate. The first transmission frame rate corresponds to a first resolution per frame. The video control server then receives (605), via a communication resource, video information from a second transmitting communication device at a second transmission frame rate. The second transmission frame rate corresponds to a second resolution per frame. Next, the video control server combines (607) the video information received from the communication devices and transmits (609) the combined video information at a third transmission frame rate to the target communication devices (which may include the transmitting communication devices), thereby ending (611) the logic flow. The third transmission frame rate corresponds to a third resolution per frame.

In a preferred embodiment, the video control server combines the received video information by reducing the first transmission frame rate, the first resolution per frame, the second transmission frame rate, or the second resolution per frame, either individually or in combination, until the combined transmission pixel rate (transmission frame rate multiplied by resolution per frame) does not exceed the communication resource's maximum pixel capacity. The combined transmission pixel rate is the pixel rate corresponding to the third transmission frame rate and the third resolution per frame.

For example, if the first communication device transmits 15 frames per second at a resolution of 120,000 pixels per frame for a transmission pixel rate of 1.8 million pixels per second, the second communication device transmits 5 frames per second at a resolution of 360,000 pixels per frame for a transmission pixel rate of 1.8 million pixels per second, and the maximum pixel capacity of the communication resource is 1.8 million pixels per second, both received video signals cannot be simultaneously retransmitted by the video control server because each received video signal occupies the entire bandwidth of the communication resource. Consequently, the video control server combines the two received video signals for simultaneous transmission, for example, by retaining the original resolution per frame for each signal and one-half of the number of received frames from each signal (e.g., by ignoring every other frame). Thus, in this case, using the above example, the video control server would transmit 7.5 frames per second at a resolution of 120,000 pixels per second of the first communication device's video information and 2.5 frames per second at a resolution of 360,000 pixels per second of the second communication device's video information to allow transmission of both images within the maximum pixel capacity of the communication resource. The net result of this combining is that the video control server transmits at a transmission frame rate (7.5+2.5=10 frames per second) and a resolution per frame (1.8 million pixels/10 frames=180,000 pixels per frame) that differ from the transmission frame rate and resolution per frame of either of the two transmitting communication devices.

In an alternative embodiment, the video control server might weight the video signals transmitted by each communication device differently. In this case, more of the communication resource bandwidth would be allocated to the higher weighted signal. For example, if the video image transmitted by the second communication device in the above example was to comprise 80% of the video information transmitted by the video control server, while the video image transmitted by the first communication device was to comprise only 20%, then the video control server might transmit 4 frames per second at a resolution of 360,000 pixels per frame of the video image received from the second communication device and only 3 frames per second at a resolution of 120,000 pixels per frame of the video image received from the first communication device to complete the combined signal. In this case, the transmission frame rate and the resolution per frame for the combined signal transmitted by the video control server would be 7 frames per second and 257,142 pixels per frame, respectively.

This embodiment of the present invention is particularly applicable in cases where two or more communication devices are providing visual images desired by all communication devices in a group (e.g., a police squadron). For example, one transmitting communication device may be providing a view of a crime scene from a different angle than another communication device. In addition, one communication device may be providing video from a camera that is scanning the crime scene, while the other communication device is providing still video. In this case, even though the video control server most likely receives video information from the first communication device at a higher transmission frame rate then from the second communication device (e.g., 15 frames per second as compared with 5 frames per second), the video control server can combine the video provided by both communication devices and retransmit the combined video to several target communication devices at a transmission frame rate (e.g., 10 frames per second) that results in an adequate resolution per frame given the bandwidth of the particular communication resource used in the conveyance.

Figure 7:
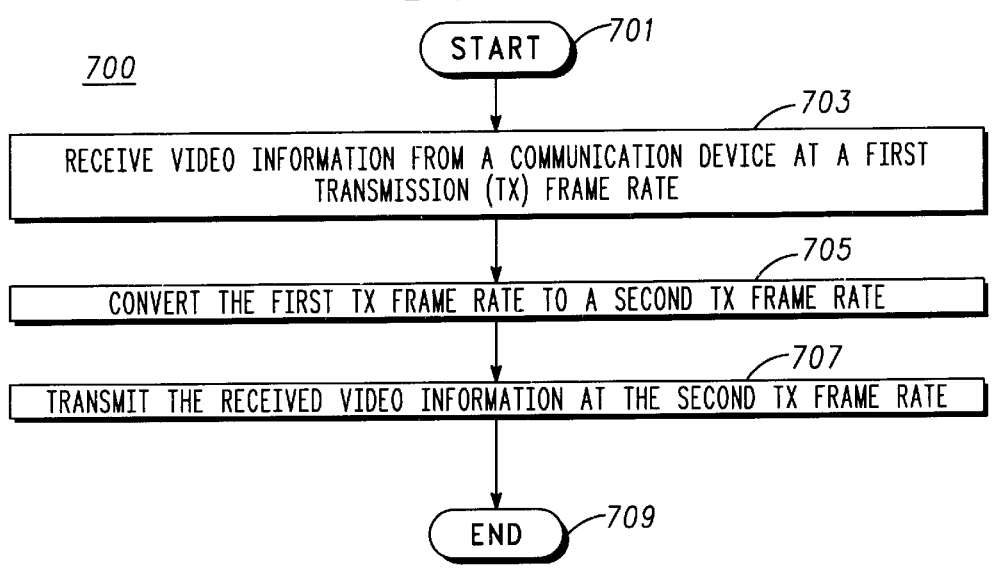
FIG. 7 illustrates a logic flow diagram of steps executed by a video control server to provide video information to at least one communication device in accordance with an alternative embodiment of the present invention.

FIG. 7 illustrates a logic flow diagram 700 of steps executed by a video control server to provide video information to at least one communication device in accordance with an alternative embodiment of the present invention. The logic flow begins (701) when the video control server receives (703) video information from a communication device at a first transmission frame rate via a first communication resource. The first transmission frame rate corresponds to a first resolution per frame. The video control server then converts (705) the first transmission frame rate to a second transmission frame rate that is less than the first transmission frame rate. This conversion is readily accomplished by discarding a fixed percentage (e.g., 10%) of the original frames and transmitting the remaining frames more slowly. In addition to converting transmission frame rates, the video control server might also change the resolution per frame of the received video information. Many techniques for changing transmission frame rate and resolution per frame are known. Some techniques involve computational algorithms executed by DSPs, while other techniques reconstruct and display the image received at the first transmission frame rate and resolution per frame, and then rescan the image using a video camera operating at the second transmission frame rate and resolution per frame. Regardless of the technique used to modify the transmission frame rate and resolution per frame, the modified transmission frame rate should not exceed the original transmission frame rate, and the modified resolution per frame should not exceed the original resolution per frame.

Next, the video control server transmits (707) the received video information to the target communication devices (which may also include the transmitting communication device) at the second transmission frame rate via a second communication resource, thereby ending (709) the logic flow.

This embodiment of the present invention is particularly applicable in cases where the video control server unilaterally decides that the broadcast video information should be at a different transmission frame rate than the video information received by the video control server. For example, when the video control server received video information from a moving communication device at a high transmission frame rate, the video control server might decide (e.g., based on the transmitting device's location) to broadcast selected images at a lower transmission frame rate to allow users of the receiving communication devices to make better informed decisions (e.g., in emergency situations).

The present invention encompasses a method and apparatus for communicating video information in a communication system. With this invention, critical geographical information can be provided visually from one communication device to other communication devices without requiring audio transmissions from a user of the transmitting communication device. This voiceless transmission of critical information allows a user of the transmitting communication device to focus attention on more immediate concerns, such as navigating and driving expediently through traffic. In addition, the present invention allows those users that are receiving the video information to select the source and the resolution per frame of the transmitted video to fit the needs of the users of the receiving devices. Existing video systems do not provide such flexibility and are not readily adaptable to radio frequency communications.

While the present invention has been particularly shown and described with reference to particular embodiments thereof, it will be understood by those skilled in the art that various changes in form and details may be made therein without departing from the spirit and scope of the present invention.

We claim:

1. A method for providing video information from a first communication device to a second communication device, the method comprising the steps of:

receiving video information from a video device coupled to the first communication device;

determining a priority between transmission frame rate and resolution per frame;

when transmission frame rate is of a higher priority than resolution per frame, transmitting the video information at a first transmission frame rate via a communication resource; and when resolution per frame is of a higher priority than transmission frame rate, transmitting the video information at a second transmission frame rate via the communication resource, wherein the second transmission frame rate is less than the first transmission frame rate.

2. The method of claim 1, wherein the step of determining a priority comprises the step of automatically determining, by the first communication device, the priority between transmission frame rate and resolution per frame based on movement of the first communication device.

3. The method of claim 1, wherein the step of determining a priority comprises the step of manually determining, by a user of the first communication device, the priority between transmission frame rate and resolution per frame.

4. The method of claim 1, wherein the step of determining a priority comprises the steps of:

manually determining, by a user of the second communication device, the priority between transmission frame rate and resolution per frame; and communicating, by the second communication device, the priority to the first communication device.

5. The method of claim 1, wherein the step of determining a priority comprises the steps of:

automatically determining, by the second communication device, the priority between transmission frame rate and resolution per frame based on a location of the first communication device; and communicating, by the second communication device, the priority to the first communication device.

6. The method of claim 5, wherein the step of automatically determining comprises the step of automatically determining the priority between transmission frame rate and resolution per frame based on the location of the first communication device with respect to an intended destination of the first communication device.

7. The method of claim 1, wherein the step of determining a priority comprises the steps of:

determining circumstantial conditions at a location of the first communication device; and selecting the priority based on the circumstantial conditions.

8. The method of claim 1, wherein the step of receiving comprises the steps of:

selecting a video device of a plurality of video devices coupled to the first communication device to produce a selected video device; and receiving the video information from the selected video device.

9. The method of claim 8, wherein the step of selecting a video device comprises the steps of:

determining circumstantial conditions at a location of the first communication device; and selecting the video device based on the circumstantial conditions.

10. The method of claim 1, wherein the step of receiving comprises the steps of:

selecting a first video device of a plurality of video devices coupled to the first communication device to produce a first selected video device;

selecting at least a second video device of the plurality of video devices coupled to the first communication device to produce at least a second selected video device; and intermittently receiving video information from the first selected video device and the at least a second selected video device to produce the video information.

11. The method of claim 1, further comprising the steps of:

selecting, by the second communication device, a video device of a plurality of video devices coupled to the first communication device to produce a selected video device; and communicating, by the second communication device, an identification of the selected video device to the first communication device, and wherein the step of receiving the video information comprises the step of receiving the video information from the selected video device.

12. The method of claim 1, wherein the second communication device comprises a dispatch operator position.

13. The method of claim 1, wherein the second communication device comprises a video control server.

14. A method for a first communication device to provide video information to a second communication device, the method comprising the steps of:

selecting a first video device of a plurality of video devices coupled to the first communication device to produce a first selected video device;

selecting a second video device of the plurality of video devices coupled to the first communication device to produce a second selected video device;

receiving video information from the first selected video device to produce first video information;

receiving video information from the second selected video device to produce second video information;

selecting a first transmission frame rate for the first video information based on a priority between transmission frame rate and resolution per frame;

selecting a second transmission frame rate for the second video information based on the first transmission rate; and transmitting the first video information at the first transmission frame rate and the second video information at the second transmission frame rate via a single communication resource.

15. A method for a video control server to provide video information to at least one communication device, the method comprising the steps of:

receiving, from a first communication device, first video information at a first transmission frame rate via a first communication resource, the first transmission frame rate corresponding to a first resolution per frame;

receiving, from a second communication device, second video information at a second transmission frame rate via a second communication resource, the second transmission frame rate corresponding to a second resolution per frame;

combining the first video information and the second video information to produce third video information; and transmitting the third video information at a third transmission frame rate to the at least one communication device, the third transmission frame rate corresponding to a third resolution per frame.

16. A method for a video control server to provide video information to at least one communication device, the method comprising the steps of:

receiving, from a communication device of the at least one communication device, video information at a first transmission frame rate via a first communication resource;

converting the first transmission frame rate to a second transmission frame rate that is less than the first transmission frame rate, wherein at least some of the conversion is achieved by discarding a part of the video information; and transmitting the video information at the second transmission frame rate to the at least one communication device via a second communication resource.

17. A method for a first communication device to obtain video information from a second communication device, the method comprising the steps of:

determining a priority between transmission frame rate and resolution per frame;

when transmission frame rate is of a higher priority than resolution per frame, receiving the video information at a first transmission frame rate via a communication resource; and when resolution per frame is of a higher priority than transmission frame rate, receiving the video information at a second transmission frame rate via the communication resource, wherein the second transmission frame rate is less than the first transmission frame rate.

18. The method of claim 17, further comprising the step of:

prior to either step of receiving the video information, communicating the priority to the second communication device.

19. The method of claim 18, wherein the step of determining a priority comprises the steps of:

determining circumstantial conditions at a location of the second communication device; and selecting the priority based on the circumstantial conditions.

20. The method of claim 18, wherein the step of determining a priority comprises the steps of:

determining whether the second communication device is in motion; and when the second communication device is in motion, selecting transmission frame rate to have a higher priority than resolution per frame.

21. The method of claim 17, further comprising the steps of:

selecting a video device of a plurality of video devices coupled to the second communication device to produce a selected video device; and communicating an identification of the selected video device to the first communication device, such that the selected video device is a source of the video information.

22. The method of claim 21, wherein the step of selecting a video device comprises the steps of:

determining circumstantial conditions at a location of the second communication device; and selecting the video device based on the circumstantial conditions.

23. A communication device for transmitting video information, the communication device comprising:

a video compressor having an input to receive digitized video information from a video device and an output to provide a compressed video output signal;

a memory device having stored therein a computer program that, when executed, performs the following functions:

determines a priority between transmission frame rate and resolution per frame;

selects a first transmission frame rate to produce a selected transmission frame rate when transmission frame rate is of a higher priority than resolution per frame; and selects a second transmission frame rate to produce the selected transmission frame rate when resolution per frame is of a higher priority than transmission frame rate, wherein the second transmission frame rate is less than the first transmission frame rate; and a radio frequency modem having a first input coupled to the output of the video compressor, a second input coupled to the memory device, and an output to transmit the compressed video output signal at the selected transmission frame rate via a radio communication resource.

24. The communication device of claim 23, further comprising an analog-to-digital converter having an input coupled to receive analog video information from the video device and an output coupled to the input of the video compressor.

25. The communication device of claim 24, wherein the analog video information comprises a National Television Standards Committee (NTSC) format.

26. The communication device of claim 23, wherein the memory device comprises a microprocessor.

27. The communication device of claim 23, wherein the video compressor comprises means for compressing the digitized video information into a format suitable for transmission over the radio communication resource.

28. The communication device of claim 27, wherein the format suitable for transmission over the radio communication resource comprises a Moving Pictures Experts Group (MPEG) format.

29. The communication device of claim 23, wherein the radio frequency modem comprises:

means for modulating the compressed video output signal into a radio frequency transmission format; and means for demodulating a received radio frequency signal into a compressed video format.

30. A radio frequency video communication system comprising:

a plurality of video devices;

a plurality of mobile radio communication devices, each of the plurality of mobile radio communication devices being coupled to at least one of the plurality of video devices and having two modes of operation, in a first mode of operation, receiving video information from at least one video device and transmitting the video information via a radio communication resource at a first transmission frame rate;

in a second mode of operation, receiving video information from the at least one video device and transmitting the video information via a radio communication resource at a second transmission frame rate, wherein the second transmission frame rate is less than the first transmission frame rate;

a radio system infrastructure that provides the radio communication resource; and a video control server, coupled to the plurality of mobile radio communication devices via the radio system infrastructure, that (i) selects a mode of operation of the two modes of operation for at least one mobile radio communication device of the plurality of mobile radio communication devices based on a priority between transmission frame rate and resolution per frame, and (ii) communicates the mode of operation to the at least one mobile radio communication device via the radio system infrastructure.

* * * * *